(12) United States Patent
Lin et al.

(10) Patent No.: US 9,509,197 B2
(45) Date of Patent: Nov. 29, 2016

(54) MANUFACTURING APPARATUS FOR A STATOR CORE

(71) Applicant: METAL INDUSTRIES RESEARCH & DEVELOPMENT CENTRE, Kaohsiung (TW)

(72) Inventors: Chih-Hao Lin, Kaohsiung (TW); Pin-Jyun Chen, Kaohsiung (TW); Yu-Ting Lin, Kaohsiung (TW); Ho-Chung Fu, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 197 days.

(21) Appl. No.: 14/555,841

(22) Filed: Nov. 28, 2014

(65) Prior Publication Data

US 2016/0118870 A1   Apr. 28, 2016

(30) Foreign Application Priority Data

Oct. 23, 2014   (TW) .............................. 103136718 A (51) Int. Cl.
*B23P 19/00* (2006.01)
*H02K 15/02* (2006.01)

(52) U.S. Cl.
CPC .......... *H02K 15/02* (2013.01); *Y10T 29/49078* (2015.01); *Y10T 29/5137* (2015.01); *Y10T 29/5317* (2015.01)

(58) Field of Classification Search
CPC .................... Y10T 29/49078; Y10T 29/5137; Y10T 29/5317; Y10T 408/65; B23P 15/246; H02K 15/02

USPC ........ 29/736, 33 L, 407.05, 596, 598, 564.1, 29/564.6, 609, 714, 732, 738
See application file for complete search history.

(56) References Cited

U.S. PATENT DOCUMENTS 5,123,155 A * 6/1992 Neuenschwander .. B21D 28/22
                                                    29/407.05
6,484,387 B1 * 11/2002 Lee ........................ B21D 37/08
                                                    29/596

FOREIGN PATENT DOCUMENTS

| CN | 202683913 U | 1/2013 |
| CN | 103700467 A | 4/2014 |
| TW | 246816 I | 1/2006 |

* cited by examiner

Primary Examiner — Thiem Phan
(74) Attorney, Agent, or Firm — patenttm.us (57) ABSTRACT

The manufacturing apparatus for a stator core has a servo pressing device, a mold, a punch assembly, a first cylinder, a second cylinder and a third cylinder. The mold is mounted on the servo pressing device and has an upper seat and a lower seat. The punch assembly is mounted in the upper seat. The first cylinder, the second cylinder and the third cylinder are mounted on the mold. The stator laminations are respectively punched by the punch assembly of the manufacturing apparatus, and are automatically stacked in the mold. The groups of stator laminations stacked in the recess are respectively pushed by the second cylinder and respectively pressed by the third cylinder. The stator laminations are automatically stacked and pressed in the mold without manpower. Therefore, the manufacturing apparatus of stator core can save manpower and reduce the equipment cost.

6 Claims, 7 Drawing Sheets

MANUFACTURING APPARATUS FOR A STATOR CORE

This application claims the benefit of the Taiwan patent application No. 103136718, filed on Oct. 23, 2014, the entire contents of which are incorporated herein by reference.

BACKGROUND OF THE INVENTION

1. Field of the Invention

The present invention relates to a manufacturing apparatus for a stator core, and more specifically to a manufacturing apparatus for a stator core to punch stator laminations from a metal strip, and to stack and press groups of stator laminations to form stator cores.

2. Description of Related Art

A conventional manufacturing process of a stator core has three steps. The first step is to punch stator laminations from a metal strip by a pressing machine and then remove the stator laminations. The second step is to stack the stator laminations manually. The third step is to press groups of the stator laminations by a riveting machine. However, to stack the stator laminations manually in the second step wastes manpower so three modifications are provided to save manpower.

The first modification: a cylinder is mounted in a pressing machine and is located in a chip-removing groove of the pressing machine. A receiving plate is mounted on a top of the cylinder. Multiple satellite equipments such as hydraulic pressure, pneumatic pressure, electrical control and photoelectric equipments are mounted on the pressing machine. The operations of the satellite equipments are cooperated to save manpower. The first modification has large quantities of satellite equipments and the equipment cost and maintenance cost are still high.

The second modification: a stacking mold is mounted on a high speed punching equipment to save manpower. However, the second modification still has the problems of high equipment and maintenance costs.

The third modification: a control box, a seat, a cylinder, a frame and a piston rod are mounted on a pressing machine to save manpower. However, the third modification still has the problems of high equipment and maintenance costs.

To overcome the shortcomings, the present invention tends to provide a manufacturing apparatus for a stator core to mitigate or obviate the aforementioned problems.

SUMMARY OF THE INVENTION

The main objective of the invention is to provide a manufacturing apparatus for a stator core to save manpower and decrease the equipment cost and maintenance cost.

The manufacturing apparatus for a stator core has a servo pressing device, a mold, a punch assembly, a first cylinder, a second cylinder and a third cylinder. The mold is mounted on the servo pressing device and has an upper seat and a lower seat. The lower seat is below the upper seat, and the lower seat has a recess and a sliding channel. The recess is formed in the lower seat. The sliding channel is formed in the lower seat, and is below and in communication with the recess. The punch assembly is mounted in the upper seat and has multiple punching heads, a pressing punch and a removing punch. The first cylinder is mounted on the upper seat and connected to the removing punch. The second cylinder is mounted on the lower seat and connected to a push rod. The third cylinder is mounted on the upper seat and is connected to the pressing punch.

The stator laminations are respectively punched by the punch assembly of the manufacturing apparatus, and are automatically stacked in the recess of the lower seat. The groups of stator laminations stacked in the recess are respectively pushed by the push rod driven by the second cylinder, and the groups of stator laminations are respectively pressed by the third cylinder. The stator laminations are automatically stacked and pressed in the mold without manpower. Therefore, the manufacturing apparatus of stator core could save manpower and reduce the production time. Moreover, the mold is mounted on the servo pressing device and fixed with the first cylinder, the second cylinder and the third cylinder to reduce quantities of the satellite equipments and reduce the equipment cost.

Other objects, advantages and novel features of the invention will become more apparent from the following detailed description when taken in conjunction with the accompanying drawings.

DETAILED DESCRIPTION OF PREFERRED EMBODIMENT

Figure 1:
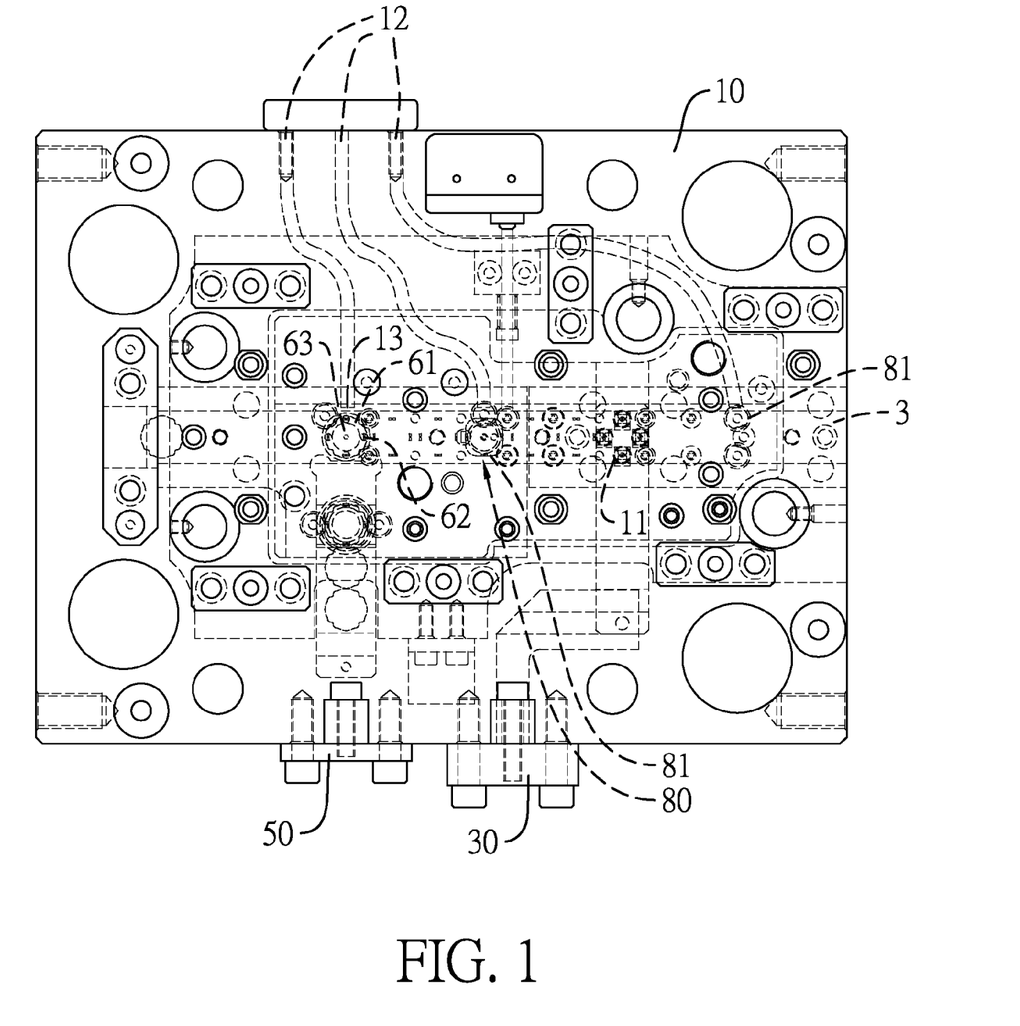
FIG. 1 is a top view of an upper seat of a manufacturing apparatus for a stator core in accordance with the present invention.
Figure 2:
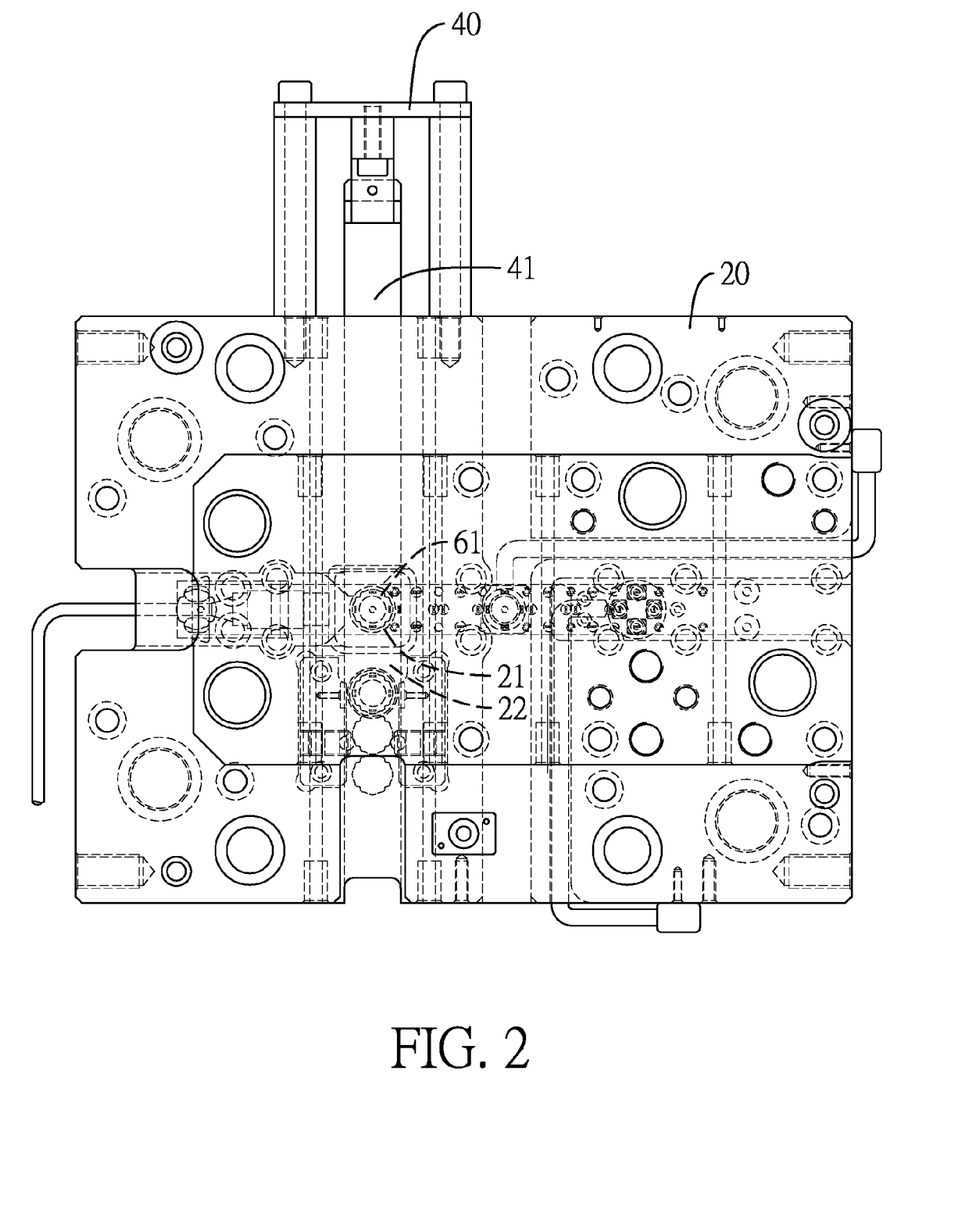
FIG. 2 is a top view of a lower seat of the manufacturing apparatus for a stator core in accordance with the present invention.
Figure 3:
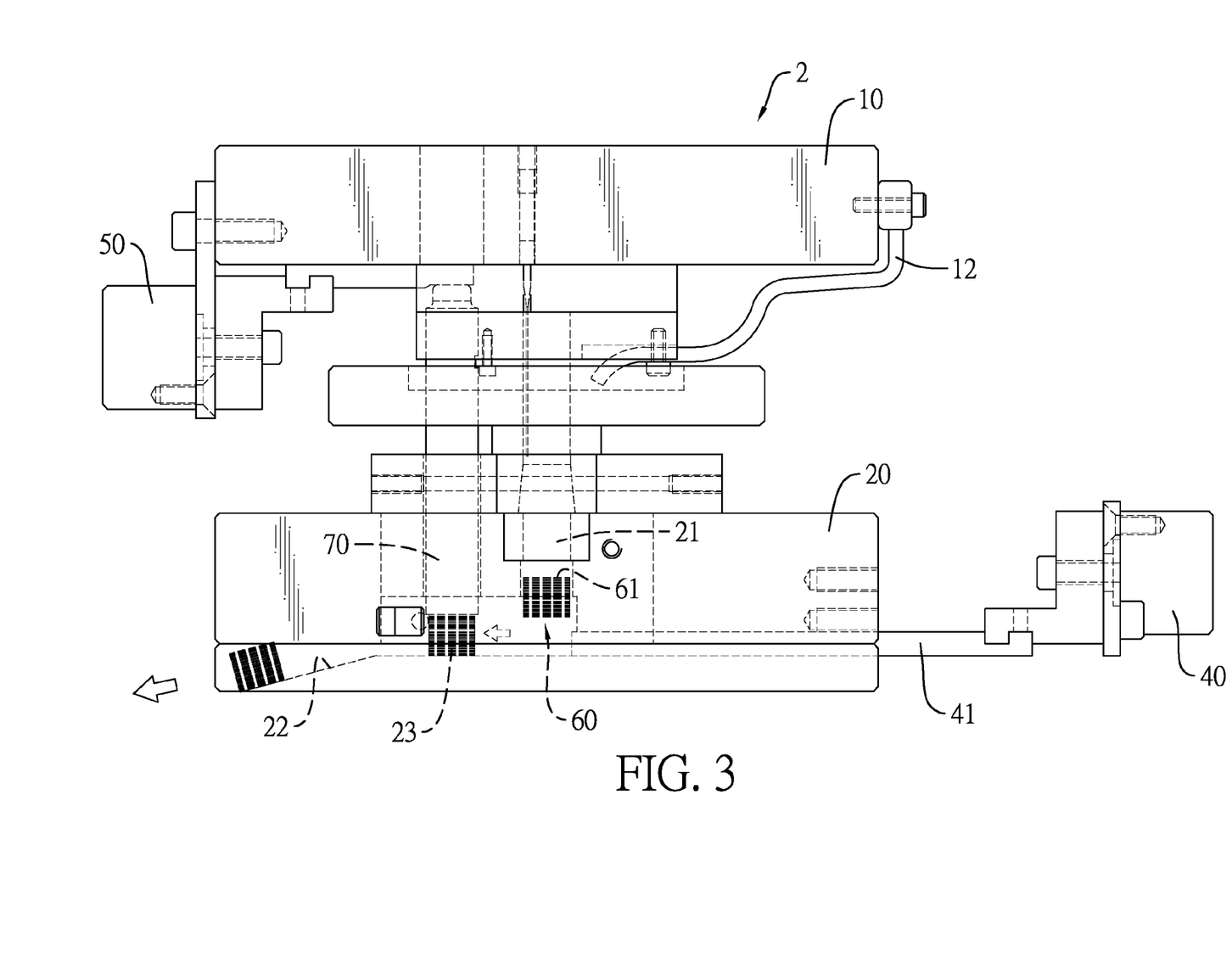
FIG. 3 is a side view of the manufacturing apparatus for a stator core in accordance with the present invention showing groups of stator laminations pushed and pressed.

With reference to FIGS. 1 to 4, a manufacturing apparatus for a stator core in accordance with the present invention comprises a servo pressing device 1, a mold 2, a punch assembly 80, a first cylinder 30, a second cylinder 40 and a third cylinder 50. With reference to FIGS. 1 to 3, the mold 2 is mounted on the servo pressing device 1 and has an upper seat 10 and a lower seat 20. The lower seat 20 is mounted below the upper seat 10, and the lower seat 20 has a recess 21 and a sliding channel 22. The recess 21 is formed in the lower seat 20. The sliding channel 22 is formed in the lower seat 20, and the sliding channel 22 is located below and in communication with the recess 21. The punch assembly 80 is mounted in the upper seat 10 and has multiple punching heads 81, a pressing punch 70 and a removing punch 11. The first cylinder 30 is mounted on the upper seat 10 and is connected to the removing punch 11. The second cylinder 40 is mounted on the lower seat 20 and is connected to a push rod 41. The third cylinder 50 is mounted on the upper seat 10 and is connected to the pressing punch 70.

Figure 4:
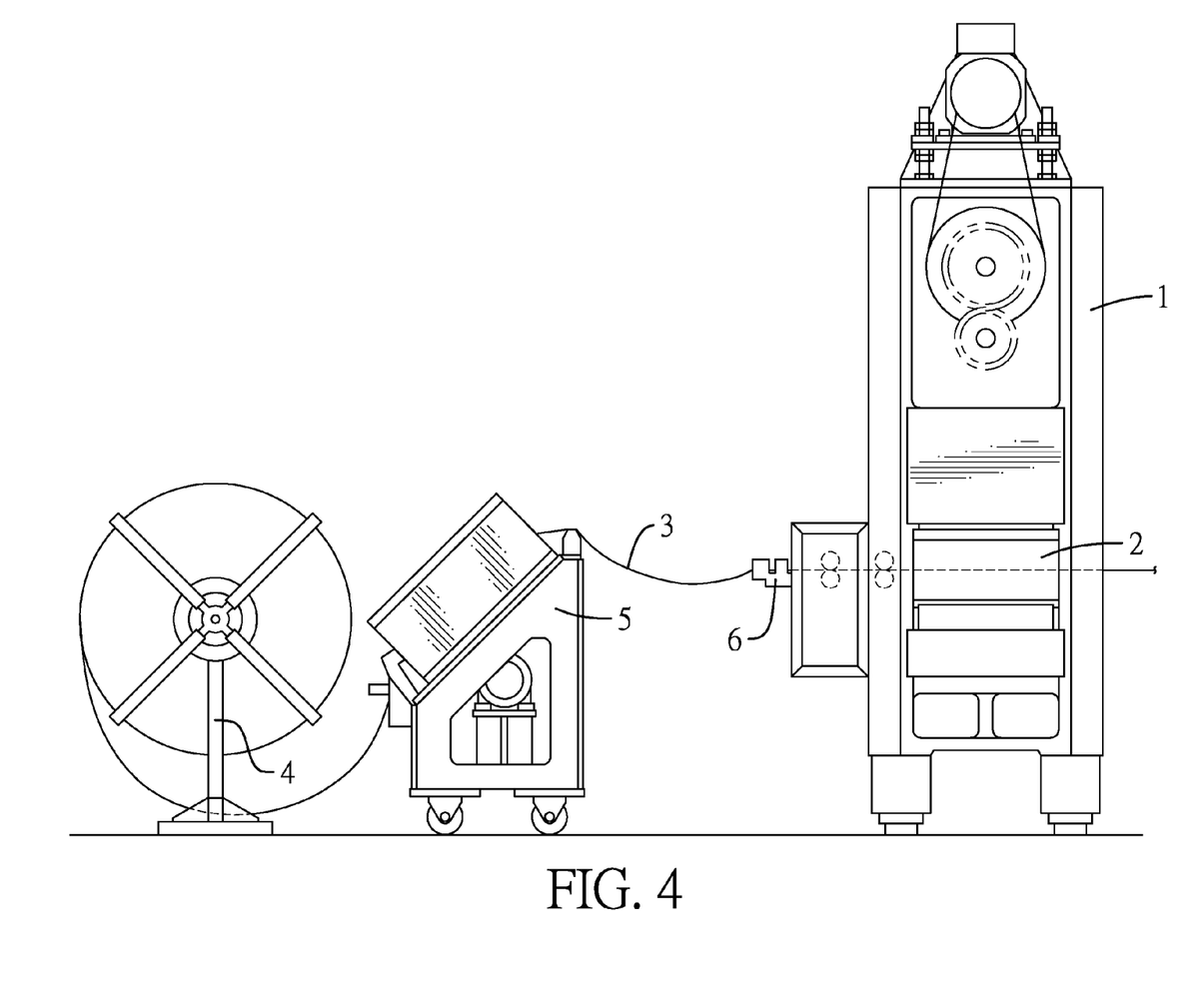
FIG. 4 shows of the manufacturing apparatus for a stator core in accordance with the present invention fixed with an uncurling machine and a feeding machine.
Figure 5:
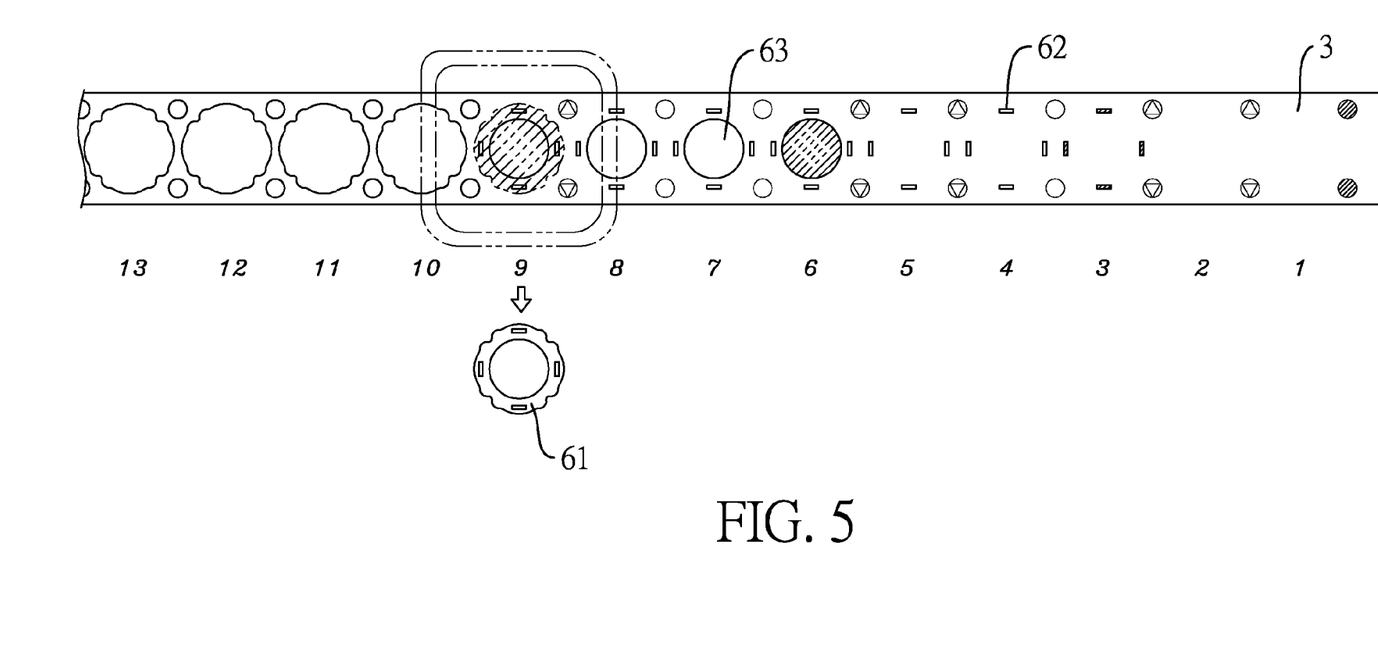
FIG. 5 is top view of a metal strip punched in the upper seat of the manufacturing apparatus in FIG. 1.
Figure 6:
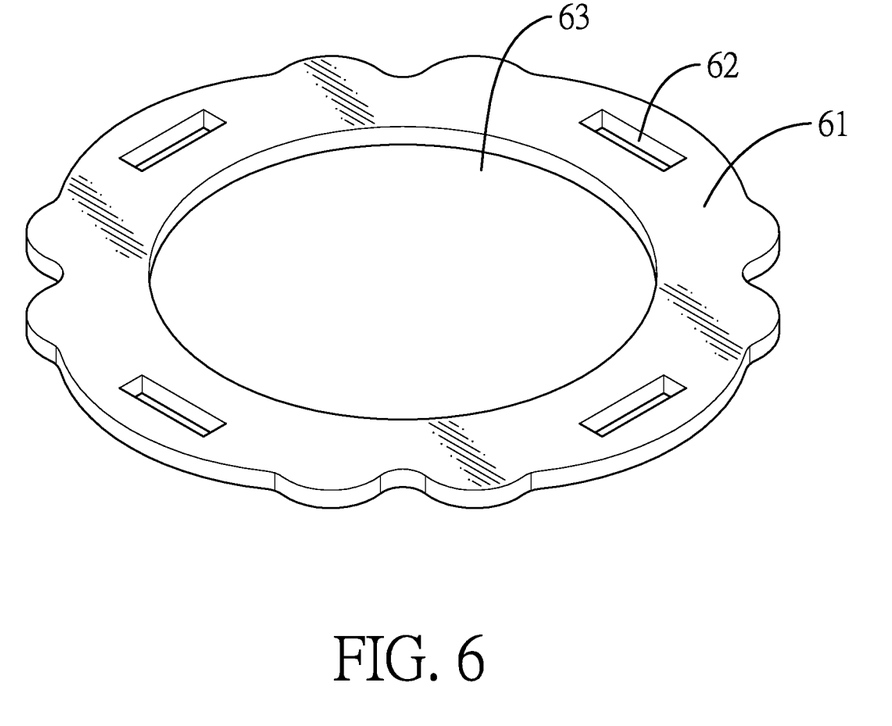
FIG. 6 is an enlarged perspective view of a stator lamination in FIG. 5.

With reference to FIG. 4, a metal strip 3 is deposited on a rack 4, and the metal strip 3 is moved through an uncurling machine 5 and a feeding machine 6. The metal strip 3 is further moved into the servo pressing device 1. With reference to FIG. 1, the metal strip 3 is moved through the removing punch 11 and then through the punching heads 81. With reference to FIGS. 5 and 6, the punch assembly 80 punches the metal strip 3 to form multiple stator laminations 61, and each stator lamination 61 has a body, multiple positioning portions 62 and a central hole 63. The positioning portions 62 are formed on the body by punching of the removing punch 11. An outer margin of the body and the central hole 63 are formed by punching of the punching heads 81.

With reference to FIGS. 1 to 3, the stator laminations 61 punched by the punching heads 81 are dropped into and are automatically stacked in the recess 21 of the lower seat 20. The stator laminations 61 stacked in the recess 21 are formed as a stator core 60 by the engagements between the positioning portions 62 of the adjacent stator laminations 61 and then the stator core 60 is dropped into the sliding channel 22. The stator core 60 dropped into the sliding channel 22 is pushed by the push rod 41 which is driven by the second cylinder 40. The stator core 60 in the sliding channel 22 is moved along the sliding channel 22 and moved to a pressing position 23 at the sliding channel 22. The stator core 60 at the pressing position 23 is pressed by the pressing punch 70 driven by the third cylinder 50, and the stator core 60 at the pressing position 23 is pushed out of the mold 2 by another stator core 60 moving to the pressing position 23.

The stator core 60 includes a first stator lamination, a second stator lamination, a third stator lamination, and so forth. The second stator lamination is stacked on the first stator lamination. The third stator lamination is stacked on the second stator lamination. The positioning portions 62 of the first stator lamination are through holes and are formed through the body of the first stator lamination. Each positioning portion 62 of the other stator laminations 61 in the stator core 60 has a cavity and a protrusion. The protrusions of the second stator lamination are inserted into the holes of the first stator lamination. The protrusions of the third stator lamination are inserted into the cavities of the second stator lamination. The first stator lamination of the stator core 60 doesn't have the protrusion as described, so a bottom surface of the first stator lamination is flat for increasing the stability of the stator core 60.

Figure 7:
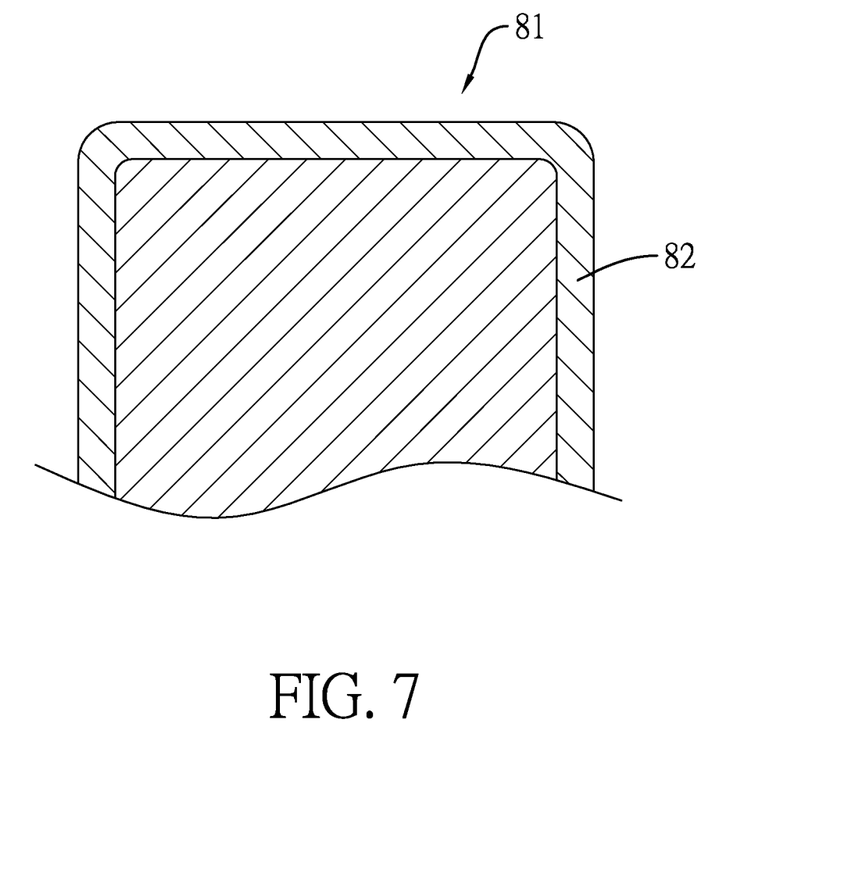
FIG. 7 is a side view in partial section of a punching head of the manufacturing apparatus for a stator core in FIG. 1.

With reference to FIGS. 1 and 3, the mold 2 has multiple cooling channels 12 formed in the mold 2, and the cooling channels 12 each respectively have an outlet 13, and the outlets 13 of the cooling channels 12 face the punching heads 81 and the removing punch 11 respectively. With reference to FIG. 7, each punching head 81 of the punch assembly 80 has an outer surface and a solid lubricant coating 82 coated on the outer surface. In addition, the pressure sustaining curve of the servo pressing device 1 has a mold cutting section, a press-riveting section and a return section, the percentage of time of the mold cutting section is 20-45% of total operating time of the pressure sustaining curve, the percentage of time of the press-riveting section is 50-70% of total operating time of the pressure sustaining curve, and the percentage of time of the return section is 5-10% of total operating time of the pressure sustaining curve. Preferably, the percentage of time of the mold cutting section is 40%, the percentage of time of the press-riveting section is 50%, and the percentage of time of the return section is 10%. Therefore, the time of the press-riveting section is longer than the time of the mold cutting section and the return section. The groups of stator laminations 61 are pressed by the third cylinder 50 in the press-riveting section. Therefore, the riveting force of groups of stator laminations 61 is increased.

When the punch assembly 80 is operating, air is blown through the cooling channels 12 to cool the punching heads 81 and the removing punch 11. The solid lubricant coating 82 of each punching head 81 can reduce the friction between the metal strip 3 and each punching head 81. Therefore, the operation of each punching head 81 doesn't need machine oil for lubrication and cooling.

Accordingly, the mold 2 is mounted on the servo pressing device 1 and fixed with the first cylinder 30, the second cylinder 40 and the third cylinder 50. Therefore, the stator laminations 61 are automatically stacked and moved for pressing by the second cylinder 40 without manpower. The manufacturing apparatus of stator core could save manpower and reduce the production time. Besides, the manufacturing apparatus of stator core could reduce quantities of the satellite equipments and reduce the equipment cost. In addition, the solid lubricant coating of each punching head 81 can reduce the friction between the metal strip 3 and each punching head 81. The solid lubricant coating of each punching head 81 could omit the oil-discharging procedure and save time. Furthermore, no oil residues remain between the stator laminations 61, so the contact area between the stator laminations 61 can be increased.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A manufacturing apparatus for a stator core comprising:
    a servo pressing device;
    a mold mounted on the servo pressing device and having
        an upper seat; and
        a lower seat below the upper seat and having
            a recess formed in the lower seat; and
            a sliding channel formed in the lower seat, and being below and communicating with the recess;
    a punch assembly mounted in the upper seat and having multiple punching heads;
    a pressing punch; and
    a removing punch;
    a first cylinder mounted on the upper seat and connected to the removing punch;
    a second cylinder mounted on the lower seat and connected to a push rod; and
    a third cylinder mounted on the upper seat and connected to the pressing punch.

2. The manufacturing apparatus for a stator core as claimed in claim 1, wherein the mold has multiple cooling channels formed in the mold, and the cooling channels each have an outlet, and the outlets of the cooling channels face the punching heads and the removing punch respectively.

3. The manufacturing apparatus for a stator core as claimed in claim 2, wherein a pressure sustaining curve of the servo pressing device has a mold cutting section, a press-riveting section and a return section, the percentage of time of the mold cutting section is 20-45% of total operating time of the pressure sustaining curve, the percentage of time of the press-riveting section is 50-70% of total operating time of the pressure sustaining curve, and the percentage of time of the return section is 5-10% of total operating time of the pressure sustaining curve.

4. The manufacturing apparatus for a stator core as claimed in claim 1, wherein each punching head of the punch assembly has an outer surface and a solid lubricant coating coated on the outer surface.

5. The manufacturing apparatus for a stator core as claimed in claim 4, wherein a pressure sustaining curve of the servo pressing device has a mold cutting section, a press-riveting section and a return section, the percentage of time of the mold cutting section is 20-45% of total operating time of the pressure sustaining curve, the percentage of time of the press-riveting section is 50-70% of total operating time of the pressure sustaining curve, and the percentage of time of the return section is 5-10% of total operating time of the pressure sustaining curve.

6. The manufacturing apparatus for a stator core as claimed in claim 1, wherein a pressure sustaining curve of the servo pressing device has a mold cutting section, a press-riveting section and a return section, the percentage of time of the mold cutting section is 20-45% of total operating time of the pressure sustaining curve, the percentage of time of the press-riveting section is 50-70% of total operating time of the pressure sustaining curve, and the percentage of time of the return section is 5-10% of total operating time of the pressure sustaining curve.

\* \* \* \* \*